United States Patent
Giallorenzi et al.

(10) Patent No.: US 6,810,028 B1
(45) Date of Patent: Oct. 26, 2004

(54) OPEN LOOP TIMING CONTROL FOR SYNCHRONOUS CDA SYSTEMS

(75) Inventors: Thomas R. Giallorenzi, Herriman, UT (US); David W Matolak, Athens, OH (US); Douglas G. Bowen, Spanish Fork, UT (US)

(73) Assignee: L-3 Communications Corp., New York, NY (US)

( * ) Notice: Subject to any disclaimer, the term of this patent is extended or adjusted under 35 U.S.C. 154(b) by 812 days.

(21) Appl. No.: 09/656,099

(22) Filed: Sep. 6, 2000

(51) Int. Cl.$^7$ ............................................. H04B 7/212
(52) U.S. Cl. ..................... 370/324; 370/320; 370/350; 375/358; 455/13.2
(58) Field of Search ................................ 370/315, 316, 370/319, 320, 321, 324, 350, 498, 503; 375/145, 293, 294, 356, 358, 362; 455/11.1, 12.1, 13.1, 13.2

(56) References Cited

U.S. PATENT DOCUMENTS

| | | | | |
|---|---|---|---|---|
| 5,784,411 A | * | 7/1998 | Willey | 375/368 |
| 6,041,222 A | * | 3/2000 | Horton et al. | 455/255 |
| 6,070,086 A | * | 5/2000 | Dobrica | 455/522 |
| 6,424,826 B1 | * | 7/2002 | Horton et al. | 455/255 |
| 6,470,057 B1 | * | 10/2002 | Hui et al. | 375/294 |

* cited by examiner

Primary Examiner—Bob Phunkulh
(74) Attorney, Agent, or Firm—Perman & Green, LLP

(57) ABSTRACT

Method and apparatus for maintaining synchronization in a CDMA communication system by operating closed loop timing control between a radio base unit and subscriber units, operating open loop timing control between the radio base unit and the subscriber units, and using timing information derived from the open loop to correct the closed loop. Generally the open loop is faster in response than the closed loop. The open loop timing control may be generated by using GPS data. A radio base station and a subscriber unit operating in accordance with these principles.

68 Claims, 4 Drawing Sheets

OPEN LOOP TIMING CONTROL FOR SYNCHRONOUS CDA SYSTEMS

BACKGROUND OF THE INVENTION

1. Field of the Invention

The invention relates to communications systems using CDMA (Code Division Multiple Access). More particularly it relates to the use of open-loop timing control for the reverse link of a synchronous CDMA system.

2. Background Art

Synchronous CDMA is an efficient multiple access scheme wherein users are allocated PN codes which are optimized to have a minimal cross correlation when time-aligned with each other. In order to benefit from these minimal cross correlations, these PN codes must be time aligned at the receiver. In the forward channel (radio base unit, RBU, to subscriber unit, SU, direction) it is easy to time align the codes because they are all modulated at the RBU. In the reverse direction, this is more difficult because the SUs are distributed throughout the cell and their transmissions must be coordinated so that their signals all arrive synchronously at the RBU. To accomplish this reverse channel synchronization, an initial coarse synchronization is performed (See U.S. Pat. No. 5,825,835). Next, a fine synchronization is performed using a timing control loop (see U.S. Pat. No. 5,867,525) which is a closed loop.

The closed-loop timing control loop operates using feedback from the RBU to the SU. The time-of-arrival (TOA) of the reverse channel signal from an SU is estimated and compared to the RBU's desired TOA. The timing error is fed back to the SU via the forward channel and the SU responds by adjusting its transmitter's timing in an attempt to drive the TOA error at the RBU to zero. Closed-loop timing control is adequate for a non-mobile synchronous CDMA system such as the Prime Wave 2000 system. However, each iteration of the closed-loop timing control loop takes a significant amount of time. As a result, if it is desirable to make the system capable of supporting mobile SUs, then the closed-loop timing control loop may be too slow to keep the users adequately synchronized.

In a mobile system, the range, and thus the propagation time between the RBU and SU will vary. As a result, the SU will need to adjust its transmitter clock more frequently than the closed loop is able to iterate. The Prime Wave 2000 system offers timing control updates about once every quarter of a second. Since the chip rate of Prime Wave 2000 is 2.72 Megachips/sec., the wavelength of a chip is 110 meters. This implies that a vehicle moving at a velocity of greater than 79 km/hour with respect to the RBU would see a 1/20 chip range change every quarter of a second. This would result in a change in TOA at the RBU of 1/10 chip every quarter of a second. This is probably the extreme limit of what the closed-loop timing control loop can track, and even this relative velocity is probably too great. If the SUs move at a higher rate, one possible approach is to speed up the closed-loop timing control loop. However, circuitry for achieving this result may not be available, or may be prohibitively expensive, especially for use in SUs, where cost can be a major issue.

SUMMARY OF THE INVENTION

It is an object of the invention to use information from the forward channel TOA (time of arrival) to determine the appropriate reverse channel transmitter adjustments.

It is another object of the invention to use a GPS receiver to provide a stable clock reference against which the received chip clock from the forward channel may be compared.

It is yet another object of the invention to provide a reference frame in which to measure forward channel TOA by using a GPS receiver to provide clocks to the RBU and SU.

In accordance with the invention, generally, an open-loop timing control loop may be used to augment the closed-loop approach. Thus, open-loop timing control may use information available at the SU to make corrections to the SU's transmitter clock. Since open-loop updates do not require feedback from the RBU, they can typically be made much more often than a closed-loop update. As a result, if open-loop corrections are used along with the standard closed-loop corrections, then an SU will be capable of remaining synchronous in a much more dynamic environment.

Generally, according to the invention, there is provided a method for maintaining synchronization in a CDMA communication system comprising operating closed loop timing control between a radio base unit and the subscriber unit, operating open loop timing control between the radio base unit and the subscriber units; and using timing information derived from the open loop to correct the closed loop. The open loop is faster in response than the closed loop. Information from a short time constant control loop and information from a long time constant control loop is combined to derive the open loop timing information. The open loop timing information is combined with a closed loop timing control update to provide information to correct the closed loop. The information used to correct the closed loop is provided as a time offset signal to adjust phase of a transmitter in a subscriber unit.

In accordance with the invention the open loop timing control may be generated by using GPS data. The data may include subscriber unit position data from a GPS receiver in the subscriber unit. The data may further include subscriber unit velocity data. Projected position data of the subscriber unit may be calculated based on the position data and the velocity data. The projected position data and the closed loop timing control update data may be used to derive a time offset signal to adjust phase of a transmitter in the subscriber unit.

In accordance with the invention, the radio base unit may receive GPS data. This data may be received by the radio base unit from a GPS receiver located in the radio base unit. The GPS data received by the radio base unit is synchronous with GPS data received by the subscriber unit. If the radio base unit is fixed in position, the GPS data may be stored in a memory in the radio base unit. If the radio base station is moved to a new location, new GPS data is loaded into the memory.

The invention is also directed to a radio base station for use in a CDMA communications system, comprising a receiver for receiving signals from subscriber units; a transmitter for transmitting signals to the subscriber units; and a source of position data associated with the radio base station for providing data concerning the position of the radio base station, the position data being transmitted by the transmitter to the subscriber units. The source of position data may be a GPS receiver or a position data memory.

The invention is further directed to a subscriber unit for a CDMA communications system, comprising a receiver for receiving signals from a radio base station; a transmitter for transmitting signals to the radio base station; a closed loop timing control circuit for adjusting timing of signals transmitted by the transmitter; an open loop timing control circuit for adjusting timing of signals transmitted by the transmitter; and a circuit for correcting the closed loop timing control based on information from the open loop timing control. The open loop timing control is faster in response than the closed loop timing control.

The subscriber unit further comprising a short time constant control loop; a long time constant control loop; and a first means for combining information from the short time constant loop and from the long time constant loop to derive the open loop timing information.

The subscriber unit may further comprise means for supplying a timing control update for the closed loop; and a second means for combining the timing control update with the open loop timing information to provide information to correct the closed loop. The second means may be a microprocessor. The second means may provide a time offset signal to correct the closed loop.

The subscriber unit may further comprise a source of GPS data; the GPS data being used to generate the open loop timing control. The source of GPS data may be a GPS receiver. It may provide GPS position data of the subscriber unit. The data may further include subscriber unit velocity data.

The subscriber unit may further comprise means for calculating projected position data of the subscriber unit based on the position data and the velocity data; and phase adjusting means for using the projected position data and closed loop timing control update data to derive a time offset signal to adjust phase of the transmitter in the subscriber unit.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
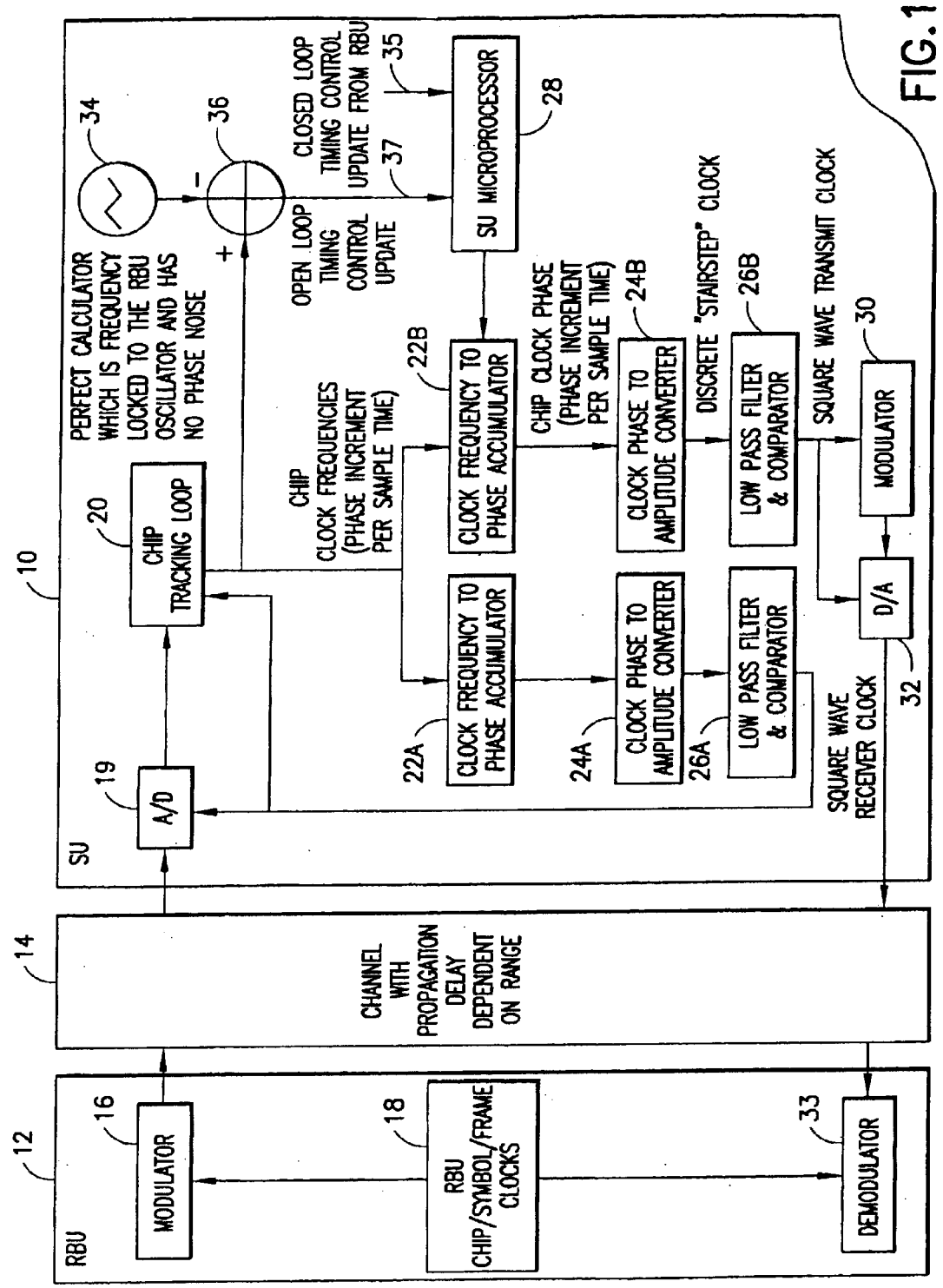
FIG. 1 is a block diagram of an idealized forward channel time-of-arrival augmented timing control loop in accordance with the concept of the invention.

Referring to FIG. 1, each of a plurality of subscriber units 10 communicates with an RBU 12 via a communication channel 14 having a propagation delay which, as is generally the case, is dependent on range between the subscriber unit 10 and RBU 12. The RBU modulator 16 obtains a clock signal from the RBU master oscillator 18, which provides chip, symbol and frame clocks, and uses the clock signal to create the forward channel timing signal.

In the receiver of the subscriber unit 10 the forward channel timing signal is converted from analog form to digital form by an analog to digital converter 19, which is associated with an early—late gate chip—tracking loop 20 used to track the incoming signal (assuming that an initial signal acquisition has already occurred). The above-mentioned Prime Wave 2000 systems use two direct digital synthesizers (DDS's) to create the receiver's chip clock and the transmitter's chip clock. In the receiver, the DDS function is implemented in FIG. 1 as a clock frequency-to-phase accumulator 22A, which provides an input to a clock phase-to-amplitude converter 24A. Chip-tracking loop 20 applies a chip frequency command to frequency-to-phase accumulator 22A to maintain a cumulative phase register. The phase register forms an input to a look-up table in clock phase to amplitude converter 24A which provides a phase to amplitude conversion. The amplitude command is then applied to a digital-to-analog converter (not shown), and then filtered by a low pass filter in low pass filter and comparator 26A, where it is smoothed to provide a sine wave function which can be squared using a comparator in low pass filter and comparator 26A. The result is a square-wave clock that is applied to the receiver's analog to digital converter 19 and to chip tracking loop 20.

Since it is desired to have the transmitter of subscriber unit 10 frequency locked to the receiver with only a phase offset, a second DDS chain including clock frequency-to-phase accumulator 22B, clock phase-to-amplitude converter 24B and low pass filter and comparator 26B is used. However, this transmit chain is given a phase offset command from the subscriber unit microprocessor 28, which is obtained from a combination of the open loop and closed loop information supplied to and useable by the microprocessor. Microprocessor 28 has an input 35 for receiving a closed loop timing control update from RBU 12. The output of an oscillator 34 (more fully discussed below) and the chip frequency command from chip-tracking loop 20 are applied to a junction 36 where they are subtracted. The difference output of junction 36 is applied to a second input 37 of microprocessor 28. Microprocessor 28 reads the closed loop timing control update on first input 35 and the open loop timing control update on second input 37 and sums them, under the control of appropriate programming code, to produce a correlation offset timing signal which is supplied to clock frequency-to-phase accumulator 22B. In other words the offset is the sum of old offset data and new input minus a command received from the RBU as represented by oscillator 34.

Clock pulses from low pass filter and comparator 26B are used by a modulator 30 to provide digital signals to be transmitted from SU 10 to RBU 12. The signals are converted from digital to analog form by a digital-to-analog converter 32. These signals, when received by RBU 12, are demodulated by a demodulator 33.

It will be understood that in FIG. 1, the channel propagation delay is a function of the transmission path length from the transmitter to the receiver. If this delay becomes larger in the forward channel (RBU to SU) then it will become larger in the reverse link (SU to RBU) as well. As a result, it is possible to measure a relative change in the time-of-arrival (TOA) of the forward channel signal and then make a correction to the reverse link transmission time based on the observed change in the forward link. As an example, if the SU receiver measures the received signal arrival time to be 1 millisecond earlier than a previous measurement, then it is reasonable to assume that the SU is closer to the RBU by a distance that corresponds to a 1 millisecond propagation time. A reasonable reaction is to then adjust the SU transmitter to transmit its signal 1 millisecond later in an attempt to maintain the same TOA at the RBU that existed at the previous measurement time.

Since the closed-loop portion of the timing control loop is relatively slow, the received TOA information can be used to speed up the overall timing control process. The received TOA is available as often as the SU circuitry can measure it. This is much more often than a closed loop offset can be reported to the SU.

The crux of making this method work is the TOA change measurement. As described above the SU has chip and carrier tracking loops that keep the SU receiver locked to the incoming signal from the RBU. To recognize a change in TOA, the SU must have a stable reference to compare the tracked signal TOA against. If it were possible to employ an ideal reference oscillator 34 that had exactly the same frequency as the RBU's transmitted signal and no phase noise, then the received signal phase could be compared against this stable reference to determine the phase offset between the two.

It is noted that the received signal phase could be any one of a number of clock phases. For example, the most common method would be to use the chip phase extracted from the early-late gate chip-tracking loop 20. Since the symbol clock is usually derived from the chip clock by dividing the chip clock by the processing gain, this symbol clock can also be used to compare against the reference oscillator. Furthermore, the frame and superframe clocks are derived from the symbol clock, so these clocks may also be used as the basis of comparison with the reference oscillator. For the purposes of discussion, it is assumed that the chip clock is used to determine the TOA.

When the received signal/reference oscillator relative phase relationship changes, the SU determines that either the range from the SU to the RBU has changed, or phase/frequency noise between the RBU oscillator and SU reference oscillator has caused the relative phase shift. If it is assumed, as in FIG. 1, that both the reference oscillator in the SU and the RBU master oscillators are perfect, in the sense that they have no phase noise, then the operation of this idealized loop becomes easy to visualize. Due to the lack of phase noise and frequency errors, the TOA estimated with the chip-tracking loop can be compared directly with the reference oscillator. Any change in the forward channel TOA will be illustrated by a phase change between the received signal and the reference oscillator. This will imply directly that the propagation time through the channel 14 has changed and that a corresponding and opposite change is required in the SU transmitter to keep the TOA at the RBU the same as it was before the propagation delay changed.

One subtle issue is that the open-loop timing control must be significantly faster than the closed-loop timing control so that an open-loop adjustment does not destabilize the closed-loop timing control. Typically this open-loop adaptation will be several times faster than the closed-loop adaptation. However, it will be understood that the long time constant loop will begin changing its timing due to the relative phase change caused by a change in the short time constant loop, which by comparison will appear to be a step function change in timing. It is necessary to take this slow change into account in making subsequent corrections.

Figure 2:
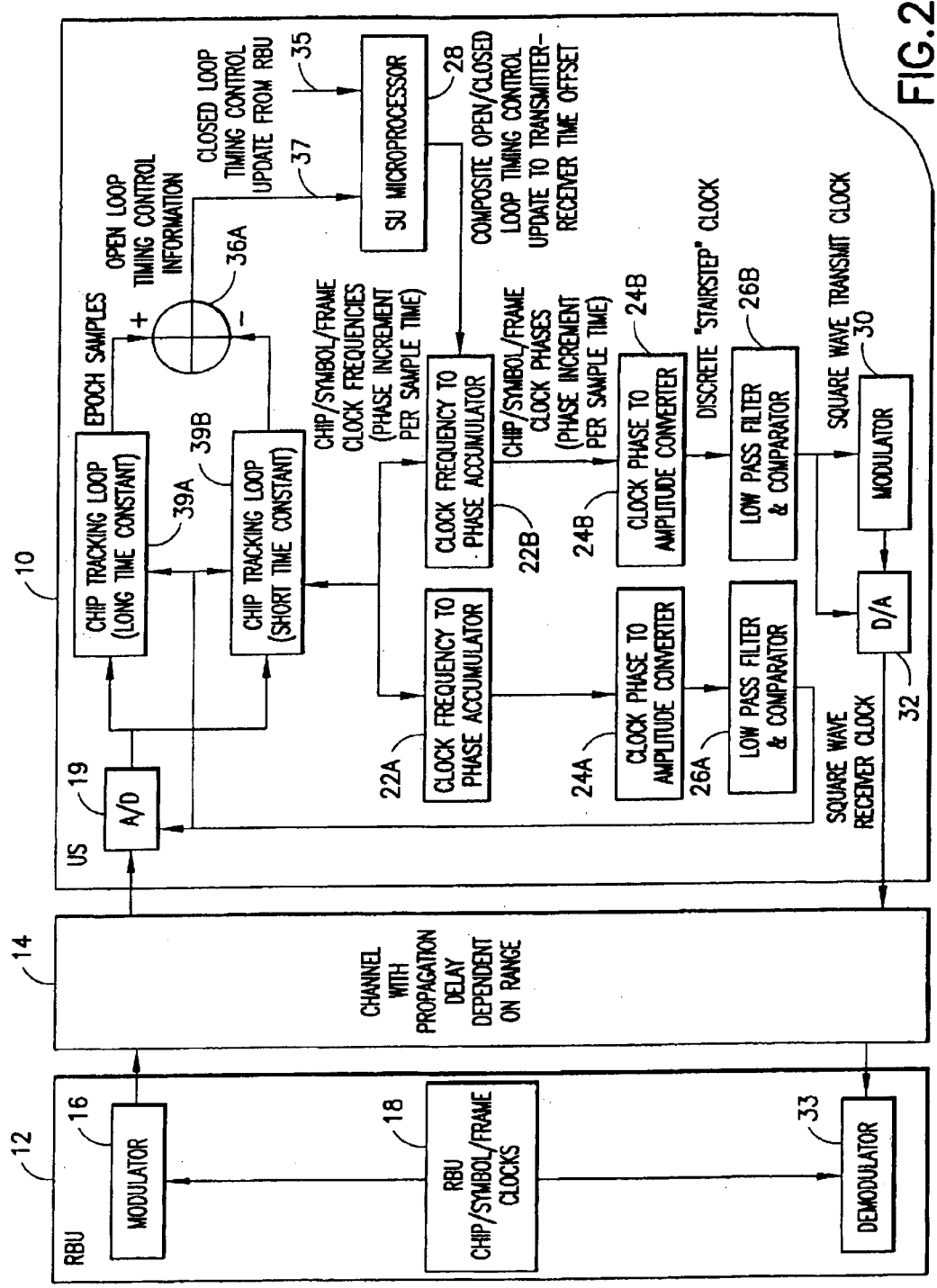
FIG. 2 is a first embodiment of a forward channel time-of-arrival augmented timing control loop in accordance with the invention.

The approach illustrated in FIG. 1 is not realistic because any real oscillator will have a frequency offset from the RBU and phase noise. FIG. 2 illustrates a method of approximating the ideal system of FIG. 1.

In FIG. 2 the ideal reference oscillator (34 of FIG. 1) is replaced with a chip-tracking loop 39A with a long time constant. There is also a chip tracking loop 39B with a short time constant. The output of chip tracking loop 39A and the output of chip tracking loop 39B are summed in junction 36A. The goal of any tracking loop is to remain either frequency locked or frequency and phase locked to an incoming signal. The time constant of the loop determines its ability to follow short-term fluctuations of the incoming signal. A chip phase tracking loop with a long time constant will track the average frequency and phase of the received signal, but will be slow to respond to short term changes in phase. As a result, this long-time-constant loop provides a reference that only follows the long-term variations of the incoming signal. If this loop's time constant is longer than the time constant of the closed-loop timing control loop, then the variations of the long-time-constant loop will be tracked by the closed-loop timing control loop. Any changes in the range between the SU 10 and the RBU 12 which are too fast for the closed-loop timing control loop to track create relative phase offsets between the long-time-constant loop and the short-time-constant loop. These relative phase changes provide information to the SU microprocessor 28 that is used to make open-loop corrections to the SU transmitter's phase.

Figure 3:
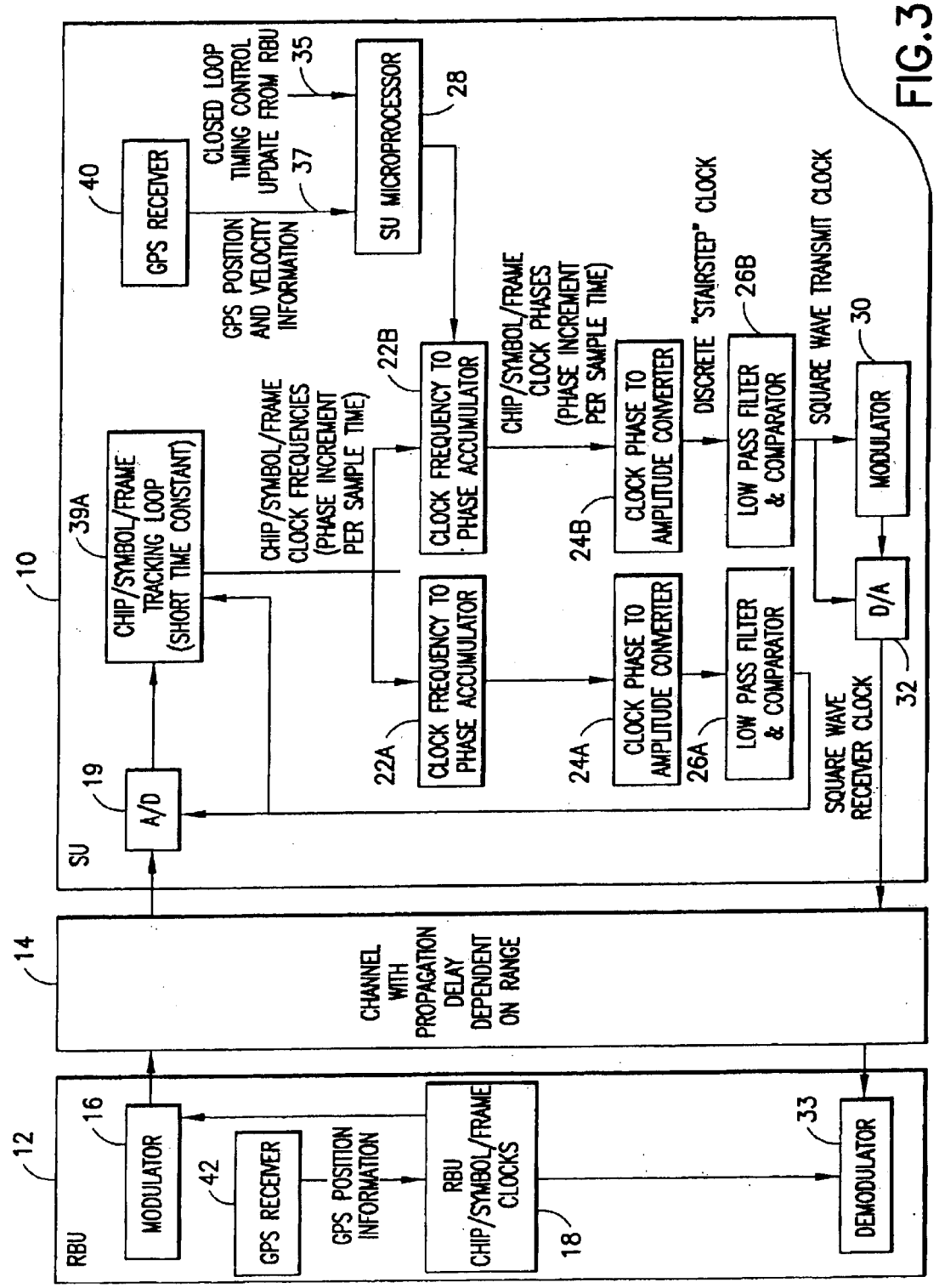
FIG. 3 is a second embodiment of a forward channel time-of-arrival augmented timing control loop in accordance with the invention.

FIG. 3 illustrates another system and method of achieving open loop timing control. A GPS receiver 40 is used to produce a clock that serves as a reference against which the forward channel clock is compared. The GPS clock must be frequency locked to the forward clock to permit the SU 10 to be able to recognize phase shifts. The RBU clocks must also be derived from the same GPS reference to insure that the RBU reference and SU reference clocks are frequency locked. Thus, the RBU has a GPS receiver 42 which produces the reference for the forward channel clock, and the GPS receiver 40 in SU 10 provides the reference to compare the received clock against. Thus, any drift in these clocks will be due to either short-term phase jitter of the GPS clocks, the synthesizers that use the GPS references or a range change between RBU 12 and SU 10. For some applications, the GPS phase jitter will be too large to allow the relative phase changes between the received forward channel clock and the SU reference clock to be attributed to a range change. In contrast, if the GPS clocks are averaged sufficiently (in other words tracked with a phase lock loop with a large time constant), then the presence of the same reference at both ends of the link will permit reasonable operation.

The system and method of FIG. 3 can be viewed as an alternative way to achieve the ideal system illustrated in FIG. 1. Since it is not possible to use a stand-alone oscillator that is frequency locked to the RBU stand-alone oscillator, instead the same clock reference is supplied to both sides of the link using GPS. This method has the disadvantage of requiring the addition of a GPS receiver to the SU. However, it has the advantage of being able to provide a perfectly frequency locked pair of references to each side of the link.

Figure 4:
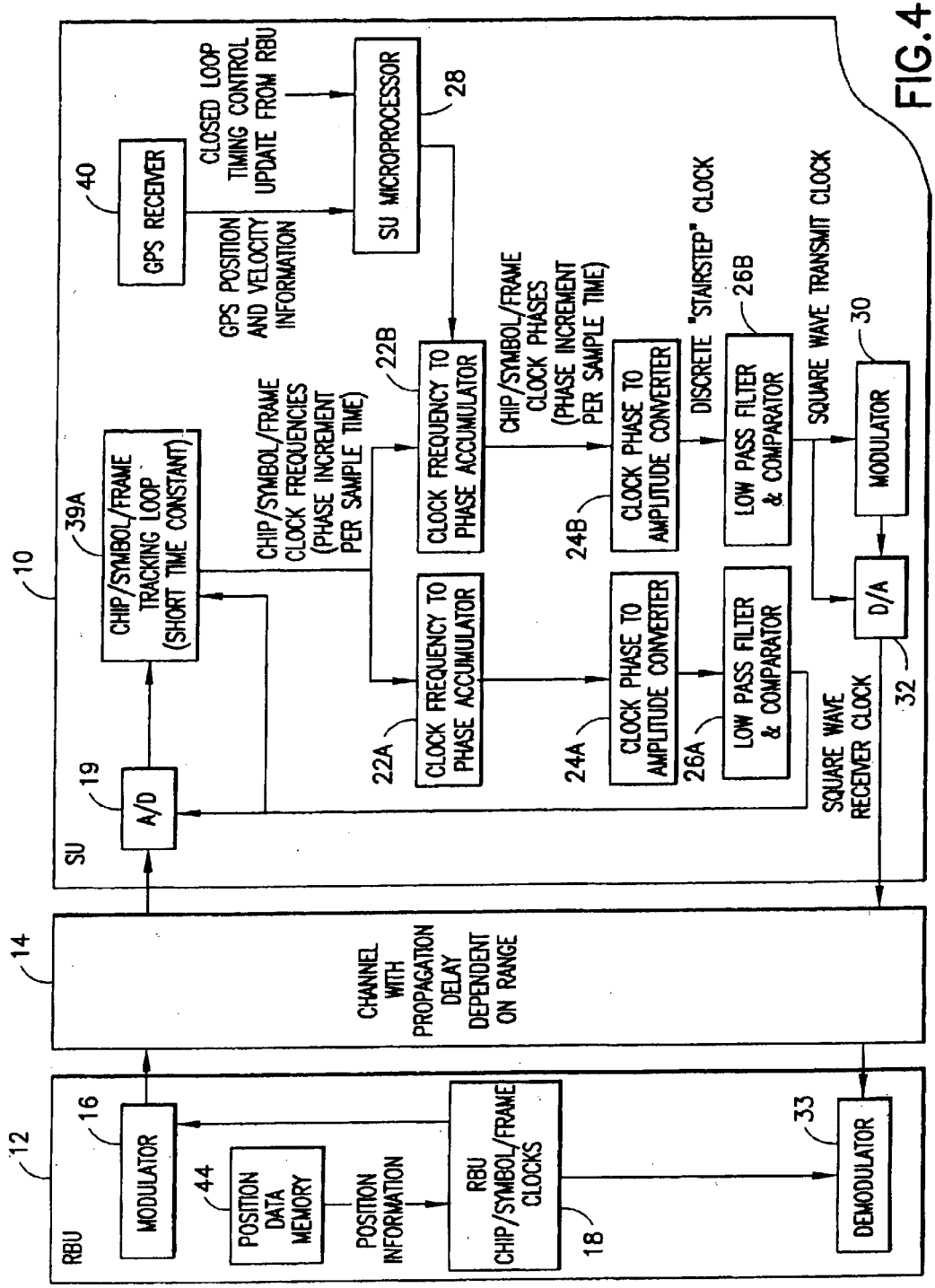
FIG. 4 is a third embodiment of a forward channel time-of-arrival augmented timing control loop in accordance with the invention.

Referring to FIG. 4, in yet another embodiment of the invention, the position and velocity estimates provided by the GPS unit in the SU is used to predictively estimate the change in the transmission time that is required to maintain synchronization at the base station. To do this, the SU must also have information concerning the location of the RBU. The RBU can transmit its latitude/longitude coordinates to any SU establishing communications with that RBU. Thus, a range estimation algorithm is used to calculate the path length change for the forward and reverse link. This algorithm may be implemented in software within the SU microprocessor 28. This algorithm calculates the current position of the SU relative to the RBU, or predictively calculates where the SU is likely be at some future time using the velocity and direction information from the GPS receiver.

This embodiment has the advantage of not requiring a GPS receiver to be permanently in place in the RBU, provided that its position remains fixed, as is almost always the case. Instead, the GPS coordinate data may simply be loaded into a position data memory 44 so that it is available for transmission to the SU's in the cell. Loading can be accomplished using a mobile GPS receiver or another source of position data, at the time of installation of the RBU. New data is necessary, if the RBU is relocated.

What is claimed is:

1. A method for maintaining synchronization in a CDMA communication system, comprising:

operating closed loop timing control between a radio base unit and subscriber units;

operating open loop timing control between the radio base unit and the subscriber units; and using timing information derived from the open loop to correct the closed loop wherein, in said subscriber units, information from a short time constant control loop and information from a long time constant control loop are combined to derive said open loop timing information.

2. The method of claim 1, wherein the open loop is faster in response than the closed loop.

3. The method of claim 1, wherein said timing information is combined with a closed loop timing control update to provide information to correct said closed loop.

4. The method of claim 3 wherein said information to correct said closed loop is provided as a time offset signal to adjust timing of a transmitter in a subscriber unit, in response to timing of a signal received from said radio base unit.

5. The method of claim 1, wherein open loop timing control is generated by using GPS data.

6. The method of claim 5 wherein the data includes subscriber unit position data from a GPS receiver in said subscriber unit.

7. The method of claim 6 wherein the data further includes subscriber unit velocity data.

8. The method of claim 7 further comprising calculating projected position data of said subscriber unit based on said position data and said velocity data; and using said projected position data and closed loop timing control update data to derive a time offset signal to adjust phase of a transmitter in said subscriber unit.

9. The method of claim 5 wherein said radio base unit receives GPS data.

10. The method of claim 9 wherein said GPS data is received by said radio base unit from a GPS receiver located in said radio base unit.

11. The method of claim 10 wherein said GPS data received by said radio base unit is synchronous with GPS data received by said subscriber unit.

12. The method of claim 9 wherein said radio base unit is fixed in position, and said GPS data is stored in a memory in said radio base unit.

13. The method of claim 12 further comprising loading new GPS data into said memory of said radio base unit when said subscriber unit is moved to a new location.

14. A method for maintaining synchronization in a CDMA communication system, comprising:
    operating closed loop timing control between a radio base unit and subscriber units;
    providing timing information from a common source external to said communication system to said radio base unit and to said subscriber units; and
    using said timing information as a reference for said closed loop timing control at said radio base station and at said subscriber units, wherein said timing information and a timing update signal from said radio base unit are combined to provide timing correction data to a transmitter in said subscriber units.

15. The method of claim 14, wherein operating said closed loop timing control comprises:
    operating a loop with a short time constant for synchronizing a receiver in said subscriber unit; and
    operating a loop with a long time constant for synchronizing a transmitter in said subscriber unit.

16. The method of claim 14 wherein said common source is a GPS signal.

17. The method of claim 14 wherein said GPS signal is a GPS time signal.

18. The method of claim 14, wherein said radio base station and said subscriber unit each have a phase locked loop, and said timing information is used to synchronize said phase locked loops.

19. A method for maintaining synchronization of a CDMA communication system, comprising:
    operating closed loop timing control between a radio base unit and subscriber units;
    providing information from a source external to said communication system to said subscriber units from which position of said subscriber units is determined;
    said radio base station providing position data representative of location of said radio base station to said subscriber units,
    in each of said subscriber units, using said information and said data to compute location of said subscriber unit; and
    correcting said closed loop timing control on the basis of a location computed by said subscriber unit.

20. The method of claim 19, wherein said information is GPS data.

21. The method of claim 19 wherein said information is also used to determine velocity of said subscriber units, said velocity also being used to compute location of said subscriber unit.

22. The method of clam 21 wherein said information is GPS data.

23. The method of claim 19 wherein, in each subscriber unit, said information and a timing update signal from said radio base unit are combined to provide timing correction data to a transmitter in the subscriber unit.

24. The method of claim 19 wherein operating said closed loop timing control comprises:
    operating a loop with a short time constant for synchronizing a receiver in said subscriber unit; and
    operating a loop with a long time constant for synchronizing a transmitter in said subscriber unit.

25. The method of claim 19, wherein said radio base station and said subscriber unit each have a phase locked loop, and said timing information is used to synchronize said phase locked loops.

26. A CDMA communication system having a radio base unit and a plurality of subscriber units, comprising:
    closed loop timing control between the radio base unit and the subscriber units;
    open loop timing control between the radio base unit and the subscriber units;
    means for correcting the closed loop timing control based on information from the open loop timing control wherein said subscriber units comprise:
    a short time constant control loop;
    a long time constant control loop; and
    a first means for combining information from said short time constant loop and from said long time constant loop to derive said open loop timing information.

27. The system of claim 26, wherein the open loop timing control is faster in response than the closed loop timing control.

28. The system of claim 26 further comprising:
    means for supplying a timing control update for said closed loop; and
    a second means for combining said timing control update with said open loop timing information to provide information to correct said closed loop.

29. The system of claim 28 wherein said subscriber units each include a transmitter, and said information to correct said closed loop is timing information used to adjust timing of said transmitter.

30. The system of claim 28 wherein said second means is a microprocessor.

31. The system of claim 28 wherein said second means provides a time offset signal to correct said closed loop.

32. The system of claim 26 further comprising a source of GPS data, said GPS data being used to generate said open loop timing control.

33. The system of claim 32 wherein the source of GPS data is a GPS receiver in said subscriber unit.

34. The system of claim 32 wherein said source of GPS data provides GPS position data of a subscriber unit.

35. The system of claim 34 wherein the data further includes subscriber unit velocity data.

36. The system of claim 35 further comprising:
means for calculating projected position data of said subscriber unit based on said position data and said velocity data; and
phase adjusting means for using said projected position data and closed loop timing control update data to derive a time offset signal to adjust phase of a transmitter in said subscriber unit.

37. The system of claim 32 wherein said radio base unit comprises means for receiving GPS data.

38. The system of claim 37 wherein said means for receiving GPS data is a GPS receiver located in said radio base unit.

39. The system of claim 38 wherein said GPS data received by said radio base unit is synchronous with GPS data received by said subscriber unit.

40. The system of claim 37 wherein said radio base unit is fixed in position, and said GPS data is stored in a memory in said radio base unit.

41. The system of claim 37 further comprising means for loading new GPS data into said memory of said radio base unit when said subscriber unit is moved to a new location.

42. A CDMA communication system having a radio base unit and subscriber units, comprising:
closed loop timing control between said radio base unit and said subscriber units;
receivers for providing from a common source external to said communication system timing information to said radio base unit and to said subscriber units; said timing information being a reference for said closed loop timing control at said radio base unit and at said subscriber units; and
wherein said subscriber units each have a transmitter further comprising a combiner for combining said timing information and a timing update signal from said radio base unit to provide timing correction data to said transmitter.

43. The system of claim 42, wherein said closed loop timing control comprises:
a loop with a short time constant for synchronizing a receiver in said subscriber unit; and
a loop with a long time constant for synchronizing a transmitter in said subscriber unit.

44. The system of claim 42 wherein said common source provides a GPS signal.

45. The system of claim 44 wherein said GPS signal is a GPS time signal.

46. The system of claim 42, wherein said radio base station and said subscriber unit each have a phase locked loop, and said timing information is used to synchronize said phase locked loops.

47. A CDMA communication system having a radio base station and subscriber units, comprising:
closed loop timing control between said radio base unit and said subscriber units;
a receiver for receiving information from a source external to said communication system and for providing said information to said subscriber units, from which information, position of said subscriber units is determined;
said radio base unit having a circuit for providing position data representative of location of said radio base unit to said subscriber units,
each of said subscriber units having a location computer for using said information and said data to compute location of said subscriber unit; and
a circuit arrangement for correcting said closed loop timing control on the basis of a location computed by said subscriber unit.

48. The system of claim 47, wherein said external source provides GPS data.

49. The system of claim 47 wherein said information is also used to determine velocity of said subscriber units, said velocity also being used to compute location of said subscriber unit.

50. The system of clam 49 wherein said information is GPS data.

51. The system of claim 47 wherein said information and a timing update signal from said radio base unit are combined to provide timing correction data to a transmitter in said subscriber unit.

52. The system of claim 47 wherein said closed loop timing control comprises:
a loop with a short time constant for synchronizing a receiver in said subscriber unit; and
a loop with a long time constant for synchronizing a transmitter in said subscriber unit.

53. The system of claim 47, wherein said radio base station and said subscriber unit each have a phase locked loop, and said timing information is used to synchronize said phase locked loops.

54. A radio base station for use in a CDMA communications system, comprising:
a receiver for receiving signals from subscriber units;
a transmitter for transmitting signals to said subscriber units;
a source of position data associated with said radio base station for providing data concerning the position of said radio base station, said position data being transmitted by said transmitter to said subscriber units; and
compared in said subscriber units to position and velocity estimates associated with the subscriber units to calculate a path length change for a forward and reverse link between the radio base station and the subscriber units.

55. The radio base station of claim 54 wherein said source is a GPS receiver.

56. The radio base station of claim 54 wherein said source is a position data memory.

57. A subscriber unit for a CDMA communications system, comprising:
a receiver for receiving signals from a radio base station;
a transmitter for transmitting signals to said radio base station;
a closed loop timing control circuit for adjusting timing of signals transmitted by said transmitter;
an open loop timing control circuit for adjusting timing of signals transmitted by said transmitter;
a circuit for correcting the closed loop timing control based on information from the open loop timing control;
a short time constant control loop;
a long time constant control loop; and
a first means for combining information from said short time constant loop and from said long time constant loop to derive said open loop timing information.

58. The subscriber unit of claim 57, wherein the open loop timing control is faster in response than the closed loop timing control.

59. The subscriber unit of claim 57, further comprising:
means for supplying a timing control update for said closed loop; and
a second means for combining said timing control update with said open loop timing information to provide information to correct said closed loop.

60. The subscriber unit of claim 59 wherein said second means is a microprocessor.

61. The subscriber unit of claim 59 wherein said second means provides a time offset signal to correct said closed loop.

62. The subscriber unit of claim 57, further comprising a source of GPS data, said GPS data being used to generate said open loop timing control.

63. The subscriber unit of claim 62 wherein the source of GPS data is a GPS receiver.

64. The subscriber unit of claim 62 wherein said source of GPS data provides GPS position data of said subscriber unit.

65. The subscriber unit of claim 64 wherein the GPS data further includes subscriber unit velocity data.

66. The subscriber unit of claim 65, further comprising:

means for calculating projected position data of said subscriber unit based on said position data and said velocity data; and adjusting means for using said projected position data and closed loop timing control update data to derive a time offset signal to adjust timing of said transmitter in said subscriber unit.

67. A method for maintaining synchronization in a CDMA communication system, comprising:

operating closed loop timing control between a radio base unit and subscriber units;

operating open loop timing control generated by using GPS data between the radio base unit and the subscriber units wherein the data includes subscriber unit position data from a GPS receiver in the subscriber unit and subscriber unit velocity data;

using timing information derived from the open loop to correct the closed loop; and calculating projected position data of said subscriber unit based on the position data and the velocity data; and using the projected position data and closed loop timing control update data to derive a time offset signal to adjust phase of a transmitter in the subscriber unit.

68. A subscriber unit for a CDMA communications system, comprising:

a receiver for receiving signals from a radio base station;

a transmitter for transmitting signals to the radio base station;

a closed loop timing control circuit for adjusting timing of signals transmitted by the transmitter;

an open loop timing control circuit for adjusting timing of signals transmitted by the transmitter;

a circuit for correcting the closed loop timing control based on information from the open loop timing control;

a GPS receiver to provide GPS position data and velocity data of the subscriber unit to generate the open loop timing control;

means for calculating projected position data of the subscriber unit based on the position data and the velocity data; and adjusting means for using the projected position data and closed loop timing control update data to derive a time offset signal to adjust timing of the transmitter in the subscriber unit.

* * * * *